Dec. 26, 1961  H. P. KOPPEHELE  3,014,234
METHOD AND APPARATUS FOR BIAXIALLY STRETCHING FILMS
Filed Dec. 21, 1959  2 Sheets-Sheet 2
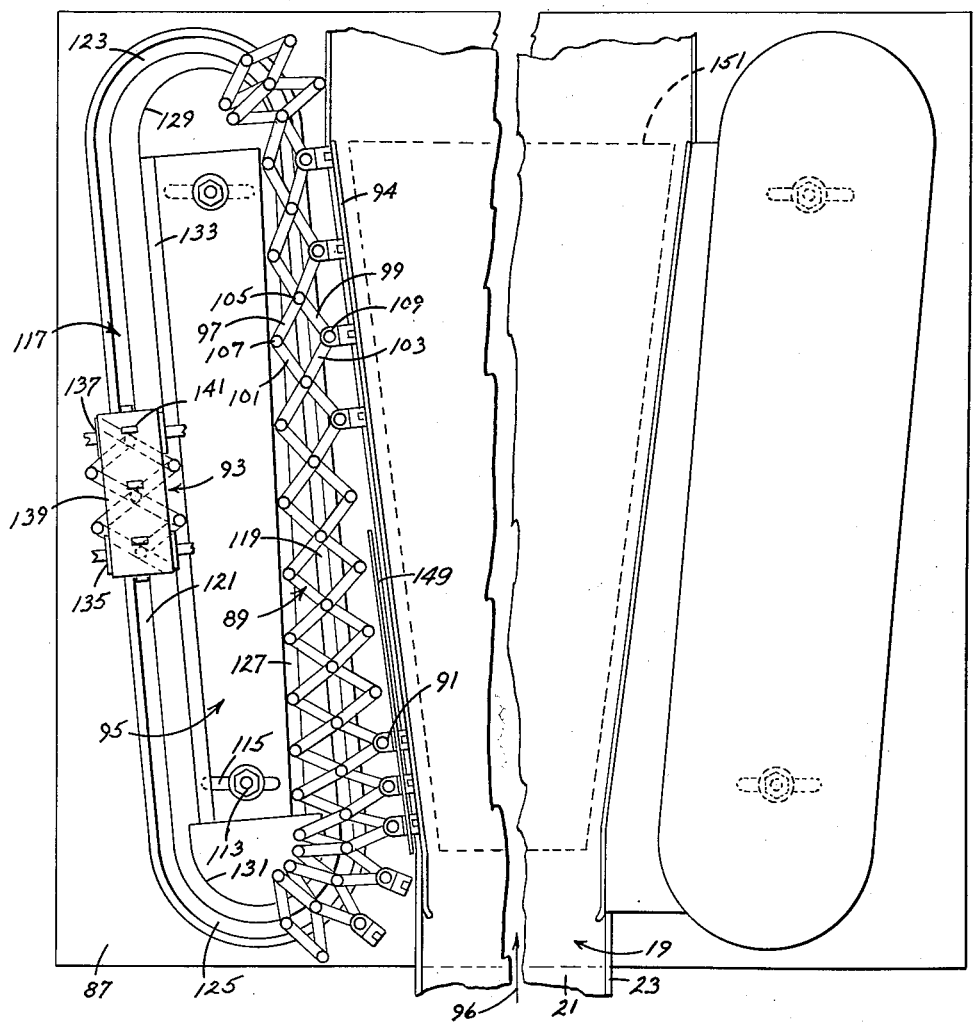
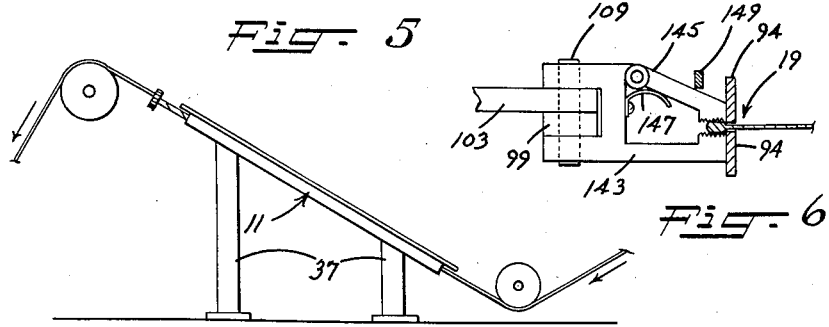

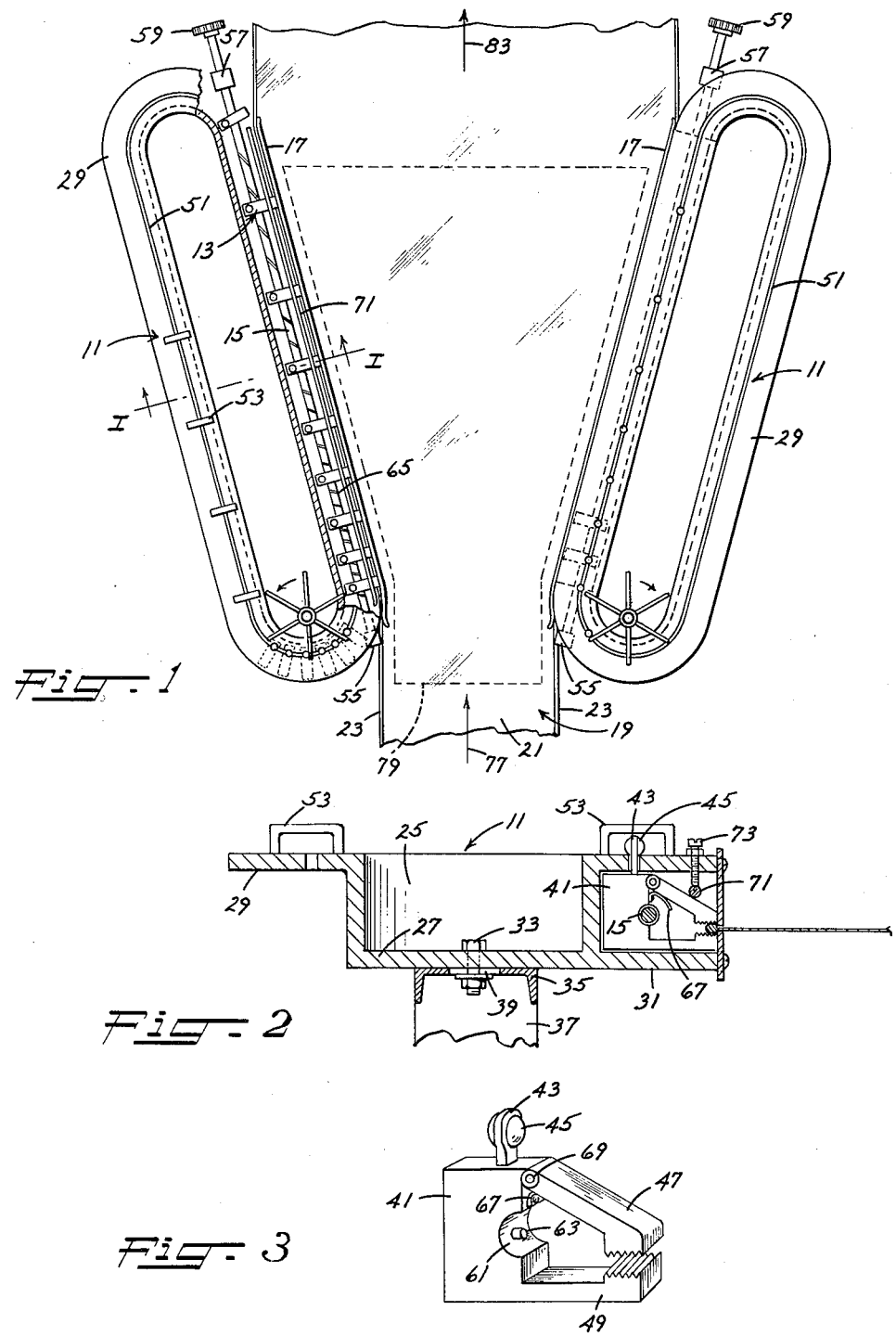

United States Patent Office 3,014,234
Patented Dec. 26, 1961

3,014,234
METHOD AND APPARATUS FOR BIAXIALLY STRETCHING FILMS
Hugo Paul Koppehele, Glen Riddle, Pa., assignor to American Viscose Corporation, Philadelphia, Pa., a corporation of Delaware
Filed Dec. 21, 1959, Ser. No. 861,048
16 Claims. (Cl. 18—1)

The present invention relates to the manufacture of plastic films or sheets, and particularly to a method and apparatus for biaxially stretching of crystalline polymeric materials to improve the properties thereof.

In the conventional manufacture of films of polymeric materials, as for example from polyethylene or polypropylene polymers, the molten polymer is extruded as a continuous sheet and is then rapidly quenched, as for example, by a cooling liquid or gas. The film thus formed is then stretched or drawn in both longitudinal and transverse directions, while in a heated condition, to effect an orientation of the polymer molecules and thereby enhance both the physical and optical properties of the film.

To insure uniform molecular orientation in all directions, and to simplify the stretching operation itself, the film is preferably stretched simultaneously in both longitudinal and transverse directions. The known procedures and apparatus for accomplishing this function, however, have not proven to be entirely satisfactory. For example, in one of the most simple and perhaps one of the most efficient of the known stretching procedures, thickened or beaded longitudinal edges of a film are slidably engaged with stationary metal tracks disposed along diverging planes. The film is drawn relative to the stationary tracks at a rate of speed which is greater than the rate of film delivery so that the film is drawn longitudinally simultaneously with its transverse stretching by the diverging tracks.

In this known system, the friction arising from the film beaded edges sliding over the stationary tracks introduces a number of problems relating to both the actual stretching operation and the properties which are imparted to the film. The sliding friction between the polymeric material and the metal track surfaces has been found to continuously vary throughout the stretching operation and is dependent upon a number of variables, ranging from the velocity and the original temperature of the beaded edges of the film to the frequency of viscoelastic response (shearing effects) due to frictional heating. The manner in which energy dissipation occurs between the output and input areas of the stretching apparatus is such that the frictional effects are brought into play in a somewhat complex manners, thus precluding the use of such known stretching devices in high speed commercial film stretching operations.

In an alternative web-stretching procedure, clips are engaged with the opposite longitudinal edges of a film and then successively advanced along divergent paths at gradually increasing speeds. With this method, however, transverse necking of the film occurs along the unsupported areas so that the resulting film is left with scalloped formations along its longitudinal edges. Removal of these scalloped edges from the film is of course necessary and wasteful. More important, the presence of these scalloped edge formations provide a clear indication that uniform biaxial stretching of the film has not been achieved along the entire film length. Accordingly, a primary object of this invention is to provide a new and improved and more satisfactory method and apparatus for simultaneously stretching a continuous film along biaxial directions.

Another object of the invention is to provide an improved method and apparatus for effecting a simultaneous biaxial stretching of a continuous beaded edge film to impart uniform physical and optical properties thereto along its entire length.

A further object of the invention is to provide an improved high speed film-stretching method and apparatus wherein gripping members are engaged with the longitudinal edges of a film and are then successively advanced along desired paths at gradually increasing speeds, with the film edges being restrained against transverse movement.

These and other objects and advantages of the invention will be apparent from the following description and accompanying drawing in which:

FIGURE 1 is a plan view of one embodiment of the film-stretching apparatus of the present invention, with portions thereof being broken away;

FIGURE 2 is a transverse vertical section taken along the line I—I of FIGURE 1;

FIGURE 3 is a perspective view of a film-gripping member employed in the apparatus of FIGURE 1;

FIGURE 4 is a side view of the apparatus shown in FIGURE 1;

FIGURE 5 is a plan view of another embodiment of the apparatus of the present invention, with portions thereof shown in detail; and FIGURE 6 is a side view of a gripping member employed in the apparatus of FIGURE 5.

In general, the apparatus of the present invention is designed for use with films having longitudinal beaded edges and includes a plurality of gripping members which are adapted to engage with the film beaded edges at longitudinally spaced intervals, means for advancing successive gripping members at gradually increasing speeds to effect a progressive stretching of the film in a longitudinal direction and tracks which slidably engage with the film beaded edges for restraining the same against movement along transverse directions. In one embodiment of the invention the movement of the successive gripping members at gradually increasing speeds is effected by driven screw conveyors, each having a thread of gradually increasing pitch. In a second embodiment of the invention, the gripping members are carried by a pair of endless conveyors, each of which is formed of a series of links pivoted to each other into a lazy-tong arrangement. As these link conveyors are advanced, cam means cause those reaches of the conveyors adjacent to the film path to be deformed and gradually elongated to thereby impart a desired movement to the gripping members.

While the apparatus here described may be employed in stretching a film in only a longitudinal direction, it is especially useful for effecting a simultaneous longitudinal and transverse film stretching and thus the film bead engaging tracks are preferably disposed along divergent paths. As will be more apparent from the following description, the engagement between the tracks and the beaded edges of the film insure proper and continuous support of the film edges during the longitudinal stretching operation and thereby facilitate a uniform biaxial stretching of the film along its entire length.

With reference to the drawing for a more detailed description of the invention, the apparatus shown in FIGURE 1 includes a pair of elongated guide members 11 which slidably support and direct a plurality of film-gripping members 13 along desired paths, screw conveyors 15 for advancing the gripping members 13, and tracks 17 carried by the guide members for slidably engaging with portions of a film during stretching thereof. The film to be strecthed, indicated at 19, travels a generally straight path between the guide members 11 and is of conventional configuration, having a web 21 and beaded longitudinal edges 23.

As best seen in FIGURE 2, the guide members 11 each include a central recessed portion 25 having a bottom wall 27, a continuous top flange 29, and a bottom flange 31 extending along that portion of the guide member which is adjacent to the path of film travel. The bottom walls 27 of the guide members 11 are releasably connected by bolts 33 to a frame structure 35 which in turn is supported in an inclined position by columns 37, as shown in FIGURE 4, for purposes as more fully described hereafter. As shown in FIGURE 2, the frame structure 35 is provided with elongated slots 39 which permit the guide members 11 to be adjusted into different divergent relationships for accommodating films of various widths.

The gripping members 13 are of identical construction and include a slide block 41, a carrier arm 43 having a captive bearing 45, and a pair of jaws 47 and 49 for gripping with the film beaded edges 23. The carrier arms 43 are fixed to the slide blocks 41 and project through endless slots 51 formed in the top flanges 29 of the respective guide member 11 so that the captive bearings 45 ridge along the top surfaces thereof. Brackets 53 extend over the respective slots 51 to maintain guide member top flanges 29 of integral construction and, as shown in FIGURE 3, the carrier arms 43 are preferably of square or rectangular cross section so as to prevent rotation of the gripping members 13 relative to the guide members 11.

During actual film stretching operations, the gripping member slide blocks 41 are supported between the flanges 29 and 31 of the respective guide members 11 and are advanced by the screw conveyors 15 which are rotatably mounted between bearings 55 and 57 and driven through gears 59 by suitable means, not shown. The slide blocks 41 are each slotted at 61 so as to partially encircle an adjacent conveyor screw 15, and include a lug or pin 63 which is adapted to engage with a thread 65 formed on the respective conveyors. As diagrammatically illustrated in FIGURE 1, the screw conveyor thread 65 is of gradually increasing pitch and thus the slide blocks of the successive gripping members engaged therewith are advanced between the guide member flanges 29 and 31 at gradually increasing speeds to thereby effect a progressive longitudinal stretching of the film, as more fully described hereafter.

Referring again to FIGURES 2 and 3, the gripping member jaws 47 and 49 are normally maintained in an open position by a spring 67 which urges the jaw 47 upwardly about its pivot 69. A cam rod 71 is adjustably supported from each of the guide member top flanges 29 by screws 73 in such positions as to engage with the movable jaws 47 of the gripping members 13 as they are advanced by the screw conveyors 15.

In practicing the method of the present invention with the above-described apparatus, the film may be preheated after which its leading end is drawn into the reduced opening between the guide members 11, with its beaded longitudinal edges 23 being disposed outwardly of the tracks 17. With the screw conveyors 15 set in operation at a slow speed, the film is manually pulled in the directed indicated by arrow 77 until the film beads 23 are in position to be engaged with the jaws 47 and 49 of the gripping members 13 as they move about the lower arcuate portions of their respective paths and mesh with the threads 65 on the adjacent conveyors 15. The conveyors 15 are then rotated at the desired speed so as to advance the film 19 in-between the diverging tracks 17 and over a heater 79 which provides or maintains the necessary heated atmosphere.

As heretofore mentioned, the threads 65 on the screw conveyors 15 are of gradually increasing pitch and thus the successive gripping members engaged with the film beaded edges 23 will be advanced at gradually increasing speeds to thereby effect a longitudinal stretching of the heated film concomitantly with its advancement between opposite ends of the stretching apparatus. In view of the divergent relationship of the tracks 17 and the paths of the gripping members 13, it will be apparent that the heated film is also progressively stretched transversely simultaneously with its longitudinal drawing.

During the advancement of the film 19 through the stretching apparatus, the longitudinal beaded edges 23 ride along the outermost surfaces of the tracks 17 as shown in FIGURE 2 and are thus prevented from moving toward each other. While the gripping members 13 engage with the beaded edges of the film at only longitudinally spaced points, the continuous engagement and support of the film beaded edges by the tracks 17 assures that the film will undergo uniform biaxial stretching and will be free of scalloped edge formations. Since the biaxial stretching of the film effects some reduction in the size of the film beaded edges 23, the cooperating tracks 17 at each side of the apparatus are preferably adjusted into gradually converging relationship so as to assure continuous retention of the film beaded edges throughout the stretching stage.

As the gripping members 13 move beyond the uppermost ends of the cam rods 71, the upper jaws 47 of the gripping members 13 are released from the film under the resilient action of the springs 67. The stretched film 19 is rapidly cooled by the ambient atmosphere or an air stream at this stage and continues to follow its straight-line course as indicated by the arrow 83 to a suitable take-up means, not shown. The gripping members 13, however, move along the upper arcuate portions of the slots 51 and, in view of inclined positioning of the device, are returned to the lower ends of the respective guide members under the action of gravity. During the entire circuitous path of the gripping members 13, the captive bearings 45 ride along the upper surface of the guide member top flanges 29 with a rolling action so that a minimum of frictional resistace is offered to the free movement of these parts. If desired, the top flanges 29 of the guide members 11 may be lubricated to further assist in obtaining free movement of the gripping members 13 along their respective paths.

The number of gripping members 13 employed with each of the guide members 11 is preferably such as to provide an accumulation of gripping members at the lower end of the guide members so that the weight of the accumulated gripping members themselves is sufficient to effect movement of the gripping members into engagement with the adjacent conveyors 15 in a desired sequence. Thus, as one gripping member 13 is released from the film and returned to the lower end of its guide member 11, the weight of this added gripping member would be sufficient to urge the entire series of accumulated gripping members toward the adjacent screw conveyor 15 and place the leading one thereof in position to be engaged with the conveyor thread 65. With this feeding procedure, the gripping members 13 will engage with the beaded edges of the film at uniformly spaced intervals. If desired, further assurance of proper delivery of the gripping members 13 may be provided by the use of driven feed wheels 85 which engage with and advance the accumulated gripping members at a desired uniform rate.

Referring now to FIGURES 5 and 6 of the drawing, the apparatus there illustrated is generally similar to that disclosed in the United States patent application of William A. Tooke, Jr. et al., Serial No. 704,992, filed December 24, 1957, now United States Patent 2,923,966, but incorporates modifications which facilitate the achievement of the objects of the present invention. This modified apparatus includes a supporting structure 87, a pair of endless conveyors 89 which carry film gripping members 91, drive means 93 for actuating the endless conveyors 89, tracks 94 for engaging with the beaded edges of the film, and a pair of guide members 95 for directing the conveyors 87 along desired paths. The endless conveyors 89 are disposed along opposite sides of the film path, indicated by the arrow 96, and are each formed of a series of links pivotally interconnected to each other to provide endless arrangement of parallelogrammatic structures which can be longitudinally expanded and retracted in much the same manner as a conventional lazy tong device. Links 97, 99, 101 and 103 of each series are connected to each other by pivot pins 105, while the links 97 and 99 are hinged by pins 107 and 109 to the ends of links 101 and 103 of an adjacent series of links. The end portions of all of the links are preferably of reduced or half thickness so that each pair of interconnected links lie in substantially the same plane.

The guide members 95 are disposed below the endless conveyors 89 and rest upon the supporting structure 87 where they are fixed in position as by bolts 113. The endless conveyors 89 and their respective guide members 95 are preferably positioned in diverging relationship, with elongated slots 115 being provided in the supporting structure 87 to facilitate adjustment thereof.

The guide members 95 along opposite edges of the film path are of identical construction, each including an endless slot 117 having substantially straight parallel portions 119 and 121 connected by arcuate end portions 123 and 125 of substantially the same radius. The lower ends of the pivot pins 105 are disposed within the slots 117 of the respective guide members 95 and ride along desired paths as the conveyors are advanced. To effect an expansion or elongation of the adjacent reaches of the opposing endless conveyors 89, the guide members 95 are each provided with a cam slot 27 which extends along a plane disposed in converging relationship with the adjacent portion 119 of the guide slot 117. The lower ends of the pivot pins 107 ride along the cam slots 127 and are gradually urged toward the pins 109 concomitantly with their advancement so that the parallelogrammatic link structures are gradually distorted in a transverse direction and effect an extension or elongation in the adjacent reaches of the opposing endless conveyors. The end portions of each of the cam slots 127 opens into cutout sections 129 and 131 in the guide members 95 which permit the parallelogrammatic link structures to retract or compress in response to the elongation occurring in the adjacent reaches of the opposing conveyors. A second guide slot 133, extending substantially parallel to the adjacent portion 121 of the slot 117, is provided in each of the support members 95 to better control the conveyors as they pass beneath the driving means 93, the latter of which are supported from an adjustable overhead structure, not shown. The driving means 93 for each of the conveyors 89 includes a pair of rolls 135 and 137 over which is trained an endless belt 139, with at least one of the rolls being driven by suitable means. The belt 139 is provided with outwardly projecting lugs 141 which are adapted to engage with the pivot pins 105 and urge the same along the guide slot 117.

The gripping members 91 are of conventional construction and are supported at spaced intervals along the endless conveyors 89 by means of the pivot pins 109. Each of the gripping members includes a fixed jaw 143 and a movable jaw 145, the latter of which is normally maintained in an open position by a leaf spring 147. As the opposing jaws of the gripping members 91 move into position at opposite sides of the beaded edges of the film, the movable jaws 145 ride along elongated cam rods 149 which sequentially urge the same toward their respective fixed jaws and thus grip the film bead therebetween. The cam rods 149 are each supported by an overhead structure, not shown, and terminate adjacent to the ends of the cam slots 127, thus allowing the film 19 to continue its straight-line course while the gripping members 91 are disengaged from the film beads 23 and commence their arcuate path along the guide slot portions 123.

In using this second described apparatus, a film 19 may be preheated and initially advanced manually toward and between the endless conveyors 15 where its longitudinal beaded edges 23 are disposed outwardly of the tracks 94 and engage with the gripping members 91. The driving means 93 are then set in operation to advance the conveyors 89 and the film gripped thereby through the stretching apparatus and over a heater 151 which elevates or maintains the film web 121 at a desired stretching temperature. The relationship of the endless conveyors 89 effects a gradual stretching of the heated film in a transverse direction simultaneously with its advancement toward the take-up means. Simultaneously with this transverse stretching of the film, the converging relationship of the cam slots 123 and guide slots 119 cause the pivot pins 109 of adjacent conveyor reaches to gradually move toward each other and thereby elongate the parallelogrammatic length structures progressively with their travel along the guide members 95. This elongation or extension of the conveyor portions engaged with the film bead causes successive gripping members 91 to be advanced at gradually increasing speeds so as to effect a progressive stretching of tht film in a longitudinal direction. As heretofore mentioned, this simultaneous longitudinal and transverse stretching of the film is preferably at the same draw ratio to insure that uniform characteristics are imparted to all portions of the film.

The gripping members 91 are released from the film beaded edges as their movable jaws 145 travel beyond the ends of the cam rods 149 so that the stretched film 19 continues along its generally straight-line course toward the take-up means while the gripping members themselves are urged along the arcuate portions 123 of the respective guide slots 117. As with the apparatus of FIGURES 1-4, the tracks 94 at each side of the film path are disposed in gradually converging relationship to insure a uniform engagement with the film beaded edges 23 as the latter are reduced in size during the stretching operation.

During the entire film-stretching operation, the beaded edge portions 23 of the film 19 ride along the outer surfaces of the cooperating tracks 94 so as to eliminate any tendency for the film to neck between adjacent gripping members 91 of the respective conveyors 89. Thus, the apparatus of FIGURE 5 achieves substantially the same results as those obtained with the structure illustrated in FIGURES 1-4; namely, a uniform and progressive stretching of a continuous film in both longitudinal and transverse directions.

While preferred embodiments of the invention have been shown and described, it is to be understood that changes and variations may be made without departing from the spirit and scope of the invention as defined in the appended claims.

I claim:

1. An apparatus for stretching a film having a web and beaded longitudinal edges including a plurality of gripping members for engaging with the beaded edges of the film at longitudinally spaced intervals, means for advancing successive gripping members along substantially straight paths at gradually increasing speeds whereby the film is progressively stretched in a longitudinal direction concomitantly with its advancement, and tracks slidably engaging with the film beaded edges for restraining the same against transverse movement toward each other.

2. An apparatus as defined in claim 1 wherein said tracks are disposed in diverging relationship and said gripping members are advanced along paths extending substantially parallel to said tracks whereby the film is progressively stretched in both longitudinal and transverse directions concomitantly with its advancement.

3. An apparatus as defined in claim 2 further including means for heating the web of the film as it is advanced relative to said tracks.

4. An apparatus for stretching a film having a web and beaded longitudinal edges including a plurality of gripping members for engaging with the beaded edges of the film at longitudinally spaced intervals, means including a pair of driven screw conveyors for engaging with and advancing said gripping members, said screw conveyors each having a thread of gradually increasing pitch whereby successive gripping members are advanced at gradually increasing speeds and effect a progressive stretching of the film in a longitudinal direction concomitantly with its advancement, and tracks slidably engaging with the film beaded edges for restraining the same against transverse movement toward each other.

5. An apparatus as defined in claim 4 wherein said tracks are disposed in diverging relationship and said gripping members are advanced along paths extending substantially parallel to said tracks whereby the film is progressively stretched in both longitudinal and transverse directions concomitantly with its advancement.

6. An apparatus for stretching a film having a web and beaded longitudinal edges including a pair of laterally spaced endless conveyors between which the film is adapted to travel, said conveyors each including a plurality of links pivotally interconnected to provide an endless lazy-tong structure, a series of gripping members carried by each of said conveyors for engaging with the beaded edges of the film at longitudinally spaced intervals, means for moving said conveyors along their respective paths, means engaging with and gradually compressing the lazy-tong structures in transverse directions during the advancement thereof whereby successive gripping members are advanced at gradually increasing speeds, and tracks slidably engaging with the film beaded edges for restraining the same against transverse movement toward each other.

7. An apparatus as defined in claim 6 wherein said endless conveyors are disposed in divergent relationship and said tracks extend substantially parallel thereto whereby the film is progressively stretched in both longitudinal and transverse directions concomitantly with its advancement.

8. An apparatus for stretching a film having a web and beaded longitudinal edges including a pair of laterally spaced endless conveyors each including a plurality of links pivotally connected to each other by pins into an endless series of interconnected link parallelograms, means for advancing said conveyors, a support plate for each of said conveyors, channels formed in said support plates, said channels receiving certain of said pivot pins for guiding said conveyors as they are advanced, a series of gripping members carried by each of said endless conveyors, means for maintaining said gripping members engaged with the beaded edges of the film, cam means on each of said support plates engaging with other of said pivot pins for gradually urging the same in a transverse direction as said conveyors are advanced whereby the link parallelograms are progressively extended in a longitudinal direction and the spacing between gripping members is increased, said endless conveyors and support plates being disposed in diverging relationship, and tracks extending substantially parallel to said conveyors and engaging with the beaded edges of the film to restrain the same against transverse movement.

9. An apparatus for stretching a film having a web and beaded longitudinal edges including a pair of screw conveyors disposed in diverging relationship, means for driving said conveyors, a plurality of gripping members adapted to be advanced by each of said conveyors from a first position to a second position, said gripping members each including a slide block, a pair of jaws carried by said slide block and adapted to engage with the beaded edges of the film, and means for connecting said slide block to a screw conveyor, means for maintaining the jaws of the gripping members engaged with the beaded edges of the film as they are advanced by said conveyors, said screw conveyors each having a thread of gradually increasing pitch whereby successive gripping members are advanced at gradually increasing speeds and effect a progressive stretching of the film in both transverse and longitudinal directions, and tracks extending substantially parallel to said screw conveyors and slidably engaging with the film beaded edges to transversely restrain the same.

10. An apparatus as defined in claim 9 wherein each of said slide blocks include an arcuate groove for receiving a screw conveyor and a lug formed within said groove for engaging with the thread of a conveyor.

11. An apparatus as defined in claim 10 further including guide means for receiving the gripping members from the screw conveyors at said second position and returning the same to said first position.

12. A method of stretching a film having a web and beaded longitudinal edges including the steps of gripping the beaded edges of the film at longitudinally spaced intervals, advancing successive longitudinal portions of the film at a gradually increasing speed to effect a progressive longitudinal stretching thereof and continuously engaging the beaded edges of the film during the longitudinal stretching thereof to restrain the same against movement along transverse directions.

13. A method as defined in claim 12 wherein the beaded edges of the film are directed along diverging paths during the longitudinal stretching thereof to effect a progressive stretching of the film in both transverse and longitudinal directions during its advancement.

14. An apparatus as defined in claim 5 wherein said tracks each include a supporting structure carrying a pair of spaced elongated members which are adapted to engage with the longitudinal beaded edges of the film along opposite edges of the film web, said elongated members having substantially straight opposing surfaces disposed in converging relationship between the entrance and exit portions thereof to provide for a gradually reduced spacing between said members.

15. An apparatus as defined in claim 7 wherein said tracks each include a supporting structure carrying a pair of spaced elongated members which are adapted to engage with the longitudinal beaded edges of the film along opposite sides of the film web, said elongated members having substantially straight opposing surfaces disposed in converging relationship between the entrance and exit portions thereof to provide for a gradually reduced spacing between said members.

16. An apparatus as defined in claim 9 wherein said tracks each include a supporting structure carrying a pair of spaced elongated members which are adapted to engage with the longitudinal beaded edges of the film along opposite sides of the film web, said elongated members having substantially straight opposing surfaces disposed in converging relationship between the entrance and exit portions thereof to provide for a gradually reduced spacing between said members.

References Cited in the file of this patent

UNITED STATES PATENTS

| | | |
|---|---|---|
| 2,342,891 | Powers | Feb. 29, 1944 |
| 2,412,187 | Wiley et al. | Dec. 3, 1946 |
| 2,728,941 | Alles et al. | Jan. 3, 1956 |
| 2,841,820 | Pfeiffer | July 8, 1958 |
| 2,923,966 | Tooke et al. | Feb. 9, 1960 |